United States Patent [19]
Gunter

[11] 3,812,420
[45] May 21, 1974

[54] BRIDGE CIRCUIT CHANGING FAULT LOCATION METHOD AND DEVICE

[75] Inventor: Donald E. Gunter, Watson, La.

[73] Assignee: General Industries, Inc., Denham Springs, La.

[22] Filed: Dec. 21, 1972

[21] Appl. No.: 317,213

[52] U.S. Cl. .............................................. 324/52
[51] Int. Cl. ............................................ G01r 31/08
[58] Field of Search ...................................... 324/52

[56] References Cited
UNITED STATES PATENTS

| | | | |
|---|---|---|---|
| 1,034,609 | 8/1912 | Friendly | 324/52 |
| 1,084,910 | 1/1914 | Stephenson | 324/52 |
| 1,329,432 | 2/1920 | Rogers | 324/52 |
| 2,615,076 | 10/1952 | Miller | 324/52 |
| 3,234,459 | 2/1966 | Brazer | 324/52 |

Primary Examiner—Gerard R. Strecker
Attorney, Agent, or Firm—Clarence A. O'Brien; Harvey B. Jacobson

[57] ABSTRACT

A device and method for locating faults in electrical conductors, said device comprising a bridge circuit adapted to be connected to operative and faulted conductors with a jumper connecting their remote ends, and switch means associated with the bridge circuit selectively movable to a first mode setting to provide a first balance condition reading corresponding to the length of the conductors and a second mode setting to provide a second balance condition reading representing a percentage of the first reading at which the fault is located from the device. A modified form of the device includes switch means with three mode settings to provide a single reading corresponding to the distance to the fault without computations. The device provides a convenient method for locating faults without necessarily knowing the size or resistivity of the operative conductor.

16 Claims, 9 Drawing Figures

Fig. 3

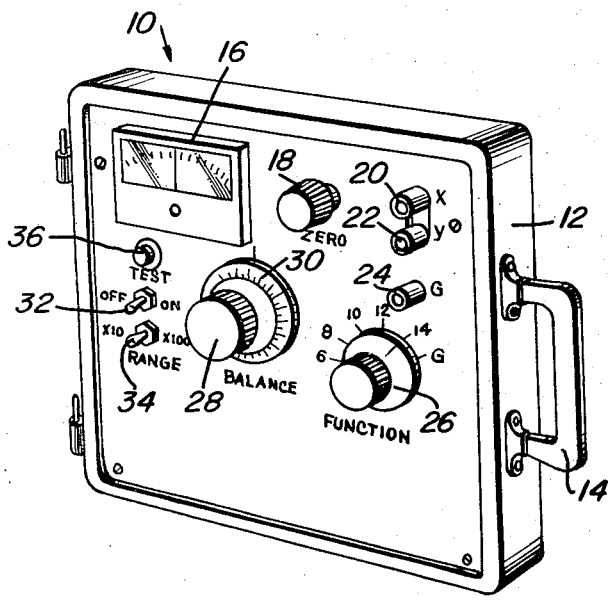

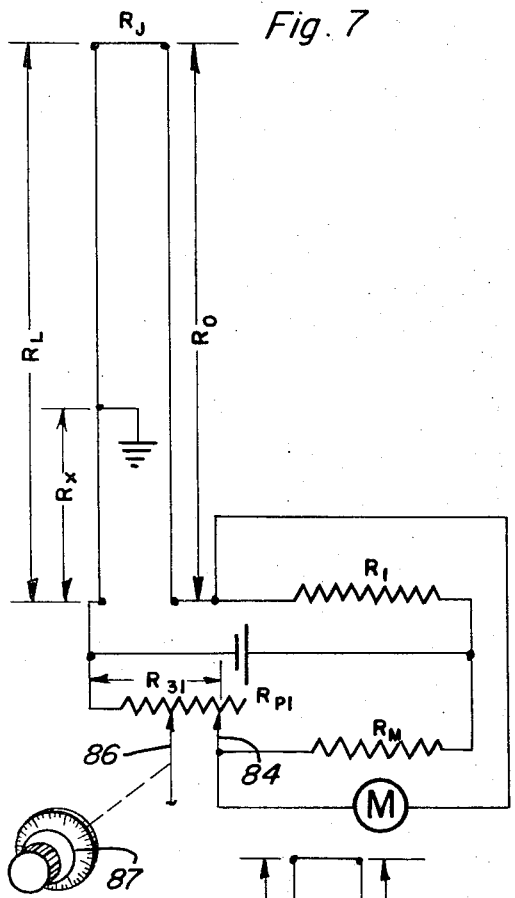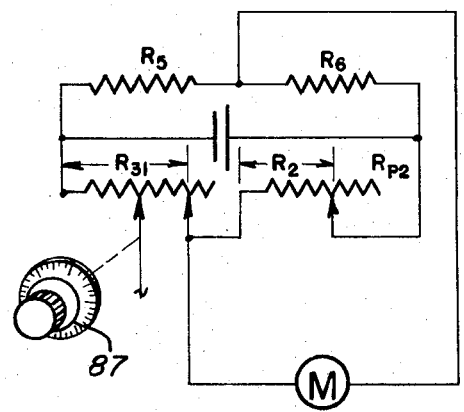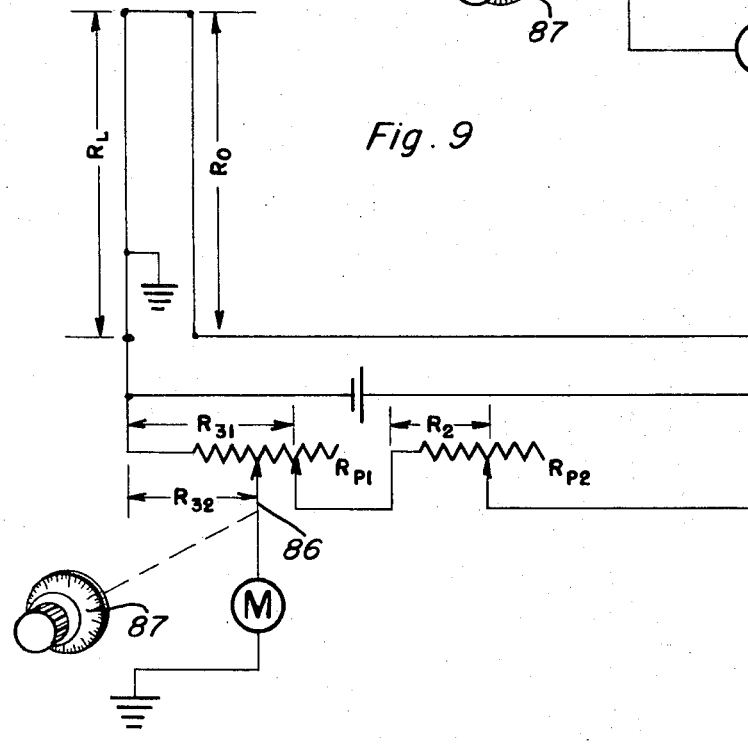

BRIDGE CIRCUIT CHANGING FAULT LOCATION METHOD AND DEVICE

The present invention is generally related to electrical testing equipment and, more particularly, to a device and method for locating faults along electrical conductors.

In the past, various devices have been provided for detecting and locating line faults. Many such devices utilized Wheatstone bridge principles, or variations thereof, to provide a plurality of readings which were used to calculate the fault location. While such conventional devices for the most part provided satisfactory results, such required time-consuming computations to obtain the fault location. The complexity of the computations often required a specially trained operator. In addition, conventional fault locating devices required that the wire size or resistance of both the faulted and operative conductors be known in order to compute the fault location.

One of the more popular systems for locating faults is the "Murray Loop," in which the resistance between the fault and one end of the faulted line is compared with the resistance of another line in the same cable. This system requires the basic assumption that the resistivity of the unfaulted line be the same as that of the faulted line. Furthermore, the computations required to obtain the fault location are relatively complex and time-consuming, and often result in error.

Another commonly used fault location method is the "Three Varley Method" which requires three measurements made of various combinations of the faulted conductor and a pair of unfaulted conductors. By subtraction and division of the results of these measurements, one arrives at the ratio of resistance from the point of measurement to the fault to the entire resistance of the faulted line. The distance to the fault was then computed by multiplying the ratio by the total length of the line. Since the resistance per unit length of each conductor does not vary appreciably, some of the inaccuracies of the "Murray Loop" were eliminated. However, as with the "Murray Loop" system, the "Three Varley Method" must be performed by a trained operator, as several measurements are required and computations must be made for the determination of the distance to the fault. It is also noted, that with both the "Murray Loop" and "Three Varley Method" it is essential that the bridge potentiometer be accurately calibrated, such that the dial readings coincide with the electrical rotation of the potentiometer, i.e., "0" on the dial corresponds to zero resistance, and "100" corresponds to the maximum resistance.

Therefore, it is an object of the present invention to provide a novel fault location device which may be easily operated by one without special training to quickly and conveniently obtain the distance to a fault from the device.

A further object of the present invention is to provide a versatile fault location device with a bridge potentiometer connected into a bridge circuit in a manner that the dial readings do not necessarily have to coincide with the electrical rotation of the potentiometer.

Another object of the present invention is to provide a unique fault location device which includes means for conveniently obtaining readings corresponding to the total conductor loop length and percentage thereof at which the fault is located from the device, without the need for knowing the size or resistivity of the operative conductor.

It is a further object of the present invention to provide a versatile fault location device including a bridge circuit with a calibrated balance dial and a resistivity selector which is set at a position corresponding to the wire size of the faulted conductor to provide readings corresponding to the total loop length and percentage thereof respectively, the product of the readings providing the distance of the fault location from the device.

Still another object of the present invention is to provide a novel method for locating line faults by first obtaining a reading corresponding to the total length of the loop formed by the operative and faulted conductors shorted together at their remote ends, second, obtaining a reading corresponding to the percentage of the first reading and, third, computing the distance to the fault by taking the product of the first and second readings.

It is another object of the present invention to provide a unique method for locating line faults by obtaining balance of a bridge circuit when connected in first, second, and third modes, whereby the setting of a bridge potentiometer in the third mode provides a reading corresponding to the distance of the fault.

It is yet another object of the present invention to provide a versatile fault location device which is of compact, relatively simple construction, accurate, reliable, easy to operate, and yet relatively inexpensive to manufacture.

These together with other objects and advantages which will become subsequently apparent reside in the details of construction and operation as more fully hereinafter described and claimed, reference being had to the accompanying drawings, forming a part hereof, wherein like numerals refer to like parts throughout.

FIG. 1 is a perspective view of the fault location device of the present invention.

FIG. 2 is a simplified schematic diagram of the circuitry utilized in the conventional "Murray Loop" method.

FIG. 3 is a schematic diagram of the circuitry associated with the fault location device of the present invention.

FIG. 7 is a simplified schematic diagram of the circuitry associated with a modified form of the present invention connected to a pair of conductors in a first mode to obtain a first balance setting.

FIG. 8 is a simplified schematic diagram of the circuitry of the modified form of the present invention connected in a second mode to obtain a second balance setting.

FIG. 9 is a simplified schematic diagram of the circuitry associated with the modified form of the present invention connected in a third mode to obtain a reading corresponding to the distance to the fault.

Figure 4:
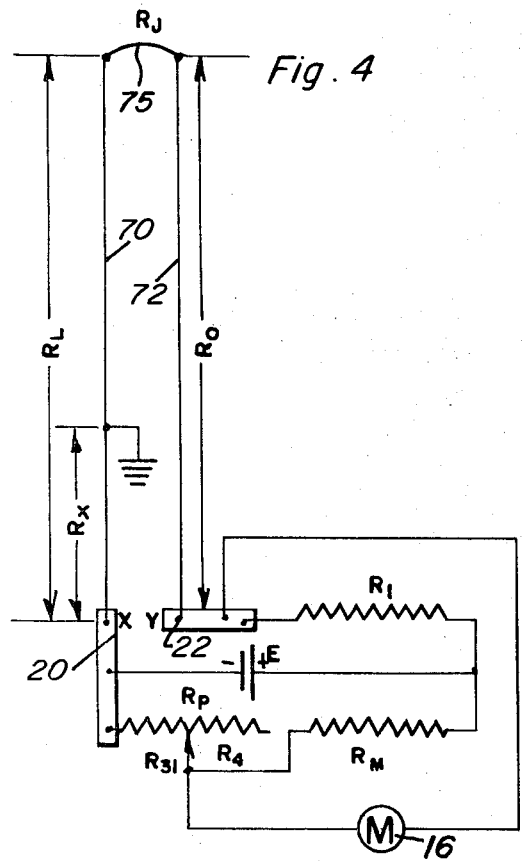
FIG. 4 is a simplified diagram of the circuitry associated with the present invention connected to a pair of conductors in a first mode to obtain a length reading.

Referring now, more particularly, to FIG. 1 of the drawings, the fault location device of the present invention is generally indicated by the numeral 10 and includes a portable housing 12 provided with a carrying handle 14 for easy transportation from place to place. The device is provided with a conventional instrument 16, such as a Galvanometer, with a "0" center position scale. Preferably, a zero adjustment knob 18 is also provided for appropriate calibration of the instrument, as may be required.

A plurality of readily accessible connection terminals 20, 22, and 24 are provided for convenient connection to the appropriate conductors when taking readings in each mode of operation. A switch 26 is provided for selecting that wire size corresponding to the faulted conductor and is connected to appropriate circuitry, as hereinafter explained. The device is provided with a balance knob 28 for balancing the bridge circuit during each mode of operation, with appropriate indicia 30 which provides the readings necessary to obtain the fault location. Preferably, the indicia is arranged from 0 to 100 corresponding to the minimum and maximum knob settings, respectively. The device is also provided with an "on-off" switch 32, range switch 34, and test button 36 connected to the circuitry, as hereinafter explained.

FIG. 2 illustrates the conventional "Murray Loop" method of fault location. A conventional bridge circuit with a potentiometer $R_p$ is connected to the ends of the faulted and unfaulted conductors 37 and 39, the remote ends of which are shorted by a jumper 41. By rotating a potentiometer knob 40, the bridge circuit may be balanced, as indicated by an appropriate meter 42. The balanced condition of the bridge may be represented by the equation $$R_a/R_p = R_x/R_L + R_J + R_0$$

where $R_L$ is the total resistance of the faulted conductor, $R_x$ is the resistance of the faulted conductor from the fault to the test instrument, $R_J$ in the jumper resistance, and $R_0$ is the resistance of the unfaulted conductor. Solving the equation for $R_x$, one arrives at $$R_x = R_a(R_L + R_J + R_0)/R_p$$

It will be appreciated, that in order to compute $R_x$ by the "Murray Loop" method, it was necessary to know the resistivity of the loop with the faulted and unfaulted conductors being of the same size and length ($R_L = R_0$) and $R_J = 0$. In addition, the accuracy of the readings was dependent upon proper calibration of the potentiometer dial, such that the dail reading coincided with the electrical rotation of the potentiometer, i.e., "0" on the dial corresponding to zero resistance, and "100" corresponding to the maximum resistance. It will also be appreciated that if there are only two conductors in a shielded cable or conduit which were shorted together, the "Murray Loop" method cannot be utilized to locate the fault.

Referring now, to FIG. 3, the circuitry of the present invention is generally indicated by the numeral 44 and includes a conventional operational amplifier 46 with input terminals connected between lines 48 and 50. The balance indication meter 16 is connected to the output terminals of operational amplifier 46, whereby the operation amplifier improves the overall sensitivity.

Balance knob 28 is mechanically coupled to a potentiometer of total resistance $R_p$ ($R_3 + R_4$) by way of a movable tap connected to line 48. One side of the potentiometer is connected by line 47 to terminal 20, which, in turn, is connected to the negative side of a battery or other d.c. voltage source E by line 49. The battery is serially connected to normally opened contacts associated with test button 36. The wire size or resistivity selector knob 26 is mechanically coupled to multi-positioned ganged switches 52, 54, 56, and 58. Preferably, the switch positions correspond to a plurality of wire gage sizes and a "Ground" function. Range selection switch 34 is connected to the movable contact of switch 52 and is movable between a "X10" position and a "X100" position for serial connection to resistors $R_{m1}$ and $R_{m2}$, respectively. By appropriately setting the range switch, the bridge resistances are changed to assure balancing under various conditions.

Resistors $R_{m1}$ and $R_{m2}$ are connected to the stationary contacts of switch 56, corresponding to the wire gauge sizes. The "Ground" position contact of switch 56 is connected by line 60 to terminal 22, which, in turn, is connected by line 62 to the movable contact of switch 58. A plurality of resistors $R_{1a}$, $R_{1b}$, $R_{1c}$, $R_{1d}$, and $R_{1e}$ are appropriately connected between the movable contact of switch 56 and the stationary contacts of switch 58 corresponding to the wire gauge sizes. An adjustable resistor $R_2$ is serially connected to $R_p$ and, preferably, is adjusted such that $R_2 = R_p$. Ground terminal 24 is connected by lead 66 to the stationary ground contact associated with switch 54. In addition, the movable contact of switch 58 is appropriately connected to the stationary contacts of switch 54 by way of line 68.

When the device is operated in a first mode to obtain a reading corresponding to the loop length, selector 26 is set at a position corresponding to the wire gauge of the faulted conductor. Balance knob 28 is then adjusted until a balanced condition is obtained as indicated by meter 16. In order to obtain balance, it may be necessary to shift switch 34 at a different multiplier range. When the bridge is balanced, an appropriate reading from dial 28 is recorded, together with the range switch multiplier to provide a first reading corresponding to the total loop length. Selector 26 is then switched to the "Ground" position, and the bridge is again balanced to obtain a second reading which corresponds to a percentage of the first reading, as balance knob 28 is calibrated from 0 to 100. The product of the first and second readings provide a number corresponding to the distance of the fault from the device.

Referring to FIG. 4, operation of the fault location device in the loop or length modes will be more fully explained. The one end of a faulted conductor 70 and one end of an unfaulted conductor 72 are appropriately connected to terminals 20 and 22, respectively. The remote ends of the conductors are shorted by a relatively short jumper 75. In addition, selector 26 is set at the appropriate wire gauge size to insert resistor $R_1$ (one of the wire gauge resistors) into one arm of the bridge circuit, with range selector 34 being switched to the appropriate position to insert $R_m$ (one of the range resistors) into another arm of the bridge circuit. When connected in this mode, the bridge balance equation may be expressed as $$R_{31}/R_m = R_L + R_J + R_0/R_1$$

Since the scale of balance knob 28 corresponds to the potentiometer resistance, the dial reading will be directly proportional to the value of $R_{31}$, where $$R_{31} = R_m (R_L + R_J + R_0)/R_1$$

If the resistivity of the faulted and operative conductors is the same, the dial reading, when multiplied by the range factor, will be equal to the actual length of the conductors. If the resistivity of the operative conductor is unknown or different from that of the faulted conductor, the reading, while not actually equal to the total loop length, will be proportional to the loop length as the reading is proportional to the total loop resistance.

Figure 5:
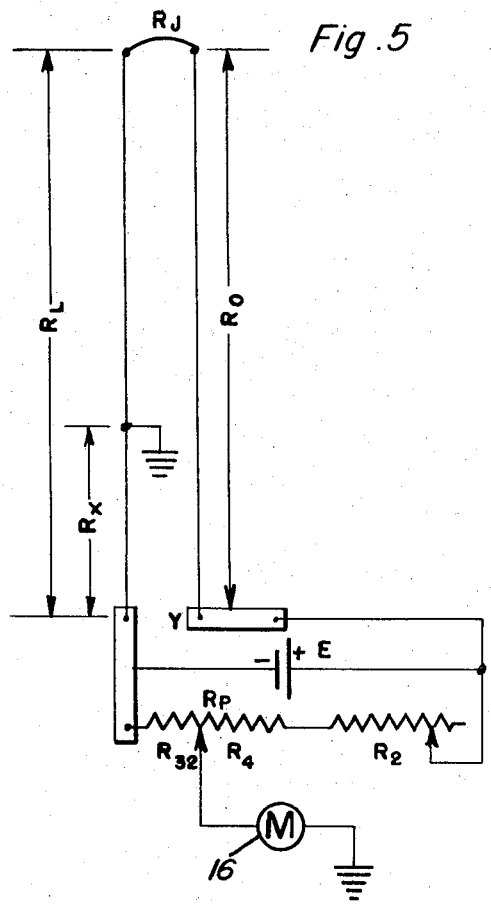
FIG. 5 is a simplified schematic diagram of the circuitry of the present invention connected to a pair of conductors in a second mode to obtain a percentage reading.

Referring to FIG. 5, operation of the device in the "percentage" mode may be more fully understood. When connected in this mode, selector 26 is switched to the "Ground" position, as illustrated in FIG. 3. This, in effect, connects one side of balance meter 16 to ground. The resistance of a portion of the faulted conductor from the fault location to the device ($R_x$) is substituted in the bridge circuit for the loop resistance ($R_L + R_J + R_0$). The resistance of the remainder of the loop ($R_L - R_x + R_J + R_0$) is substituted for $R_1$ in the bridge circuit. In addition, when switching to the second mode of operation, the combined resistance of $R_2 + R_4$ is substituted in the bridge circuit for the value of $R_m$. Thus, the balance equation is $$R_{32}/R_2 + R_p = R_x/R_L + R_J + R_0$$

where $R_2 = R_p$. Substituting the appropriate values and solving for $R_{32}$, one obtains $$R_{32} = R_x \times (R_p + R_2)/R_L + R_J + R_0$$

By taking the product of the first and second readings, one arrives at a number corresponding to the distance of the fault location from the device. This may be defined algebraically by the equation $$R_{31} \times R_{32} = (R_L + R_J + R_0) R_m R_x (R_p + R_2)/R_1 (R_L + R_J + R_0)$$

$$= (R_m/R_1) \times R_x \times 2R_p$$

In other words, the product of the first and second readings is directly proportional to the ratio of $R_x/R_1$, where $R_1$ corresponds to the wire gauge setting of the faulted conductor. Since ($R_L + R_J + R_0$) cancels when the product of the first and second readings is taken, the resistivity of the unfaulted conductor need not be known and the resistivity of the jumper will not affect the accuracy of the answer.

Figure 6:
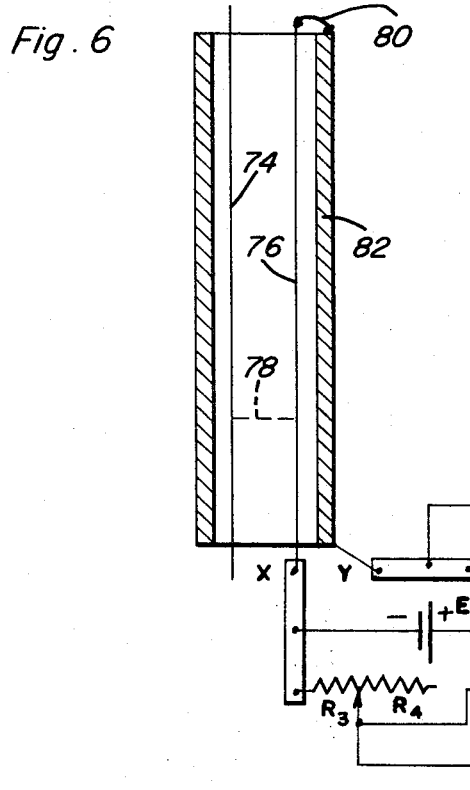
FIG. 6 is a simplified schematic diagram similar to FIG. 4, but connected to a conduit and faulted conductor.

The schematic diagram shown in FIG. 6 illustrates the device connected in the loop resistance mode for the purpose of locating a fault, as indicated in dash line at 78, between a pair of shorted conductors 74 and 76. A jumper 80 is provided between conductor 76 and a conductor 82, whereby the conduit serves as the operative conductor for the purposes of obtaining the length reading. It will be appreciated, of course, that the length reading obtained is merely a theoretical value, but which, when multiplied by the percentage reading, provides the actual distance to the fault. It is necessary that the operator take only two readings and the product thereof to obtain the fault location. Furthermore, since the instrument is provided with a selector switch with wire gauge markings, the operator need not be concerned with resistivity, actual conductor lengths, and the like, as with many conventional devices. It will also be appreciated that due to the unique circuitry of the device, the resistivity or gauge of the return conductor need not be known in order to locate the fault.

Referring now, more particularly, to FIGS. 7-9, simplified schematic diagrams of the circuitry of a modified form of the present invention are illustrated. The modified form of the invention is operated in a manner similar to the above-described form of the invention, but does not require that first and second readings be taken and their product computed to obtain the distance to the fault. This is achieved by providing a dual tap potentiometer $R_{p1}$, and a single tap potentiometer $R_{p2}$ which is insertable into the bridge circuit in a second mode of operation, as hereinafter explained. The dual tap potentiometer $R_p$ is provided with first and second taps 84 and 86 which are manually adjustable independent of each other. Tap 86 is mechanically coupled to a calibrated dial, or other selector with appropriate indicia to provide the desired readings when the bridge circuit is balanced in a third mode of operation.

The schematic diagram of FIG. 7 shows the device connected in a first mode of operation which is the same as the "loop" mode explained above, and illustrated in FIG. 4. In this mode, tap 86 is not utilized, with tap 84 alone being adjusted to achieve balance. The balance equation for the circuitry connected in the first mode is as follows:

$$R_{31}/R_m = R_L + R_J + R_0/R_1$$

$$R_{31} = R_m \times (R_L + R_J + R_0)/R_1$$

The second mode of operation is illustrated in FIG. 8. It will be observed that a second potentiometer $R_{p2}$ is connected into the circuitry together with resistors $R_5$ and $R_6$. This is achieved by way of switches such as the ganged switches associated with the circuitry illustrated in FIG. 3. Since the modification of the circuitry to provide such switching would be apparent to one skilled in the art, a detailed discussion of such switching circuitry is deemed unnecessary. With the device set in the second mode, potentiometer $R_{p2}$ is adjusted to insert a resistance value of $R_2$ into one leg of the bridge circuit. The balance equation for the second mode of operation is as follows:

$$R_{31}/R_2 = R_5/R_6$$

Since the resistance values of $R_5$ and $R_6$ are known, the ratio of $R_{31}/R_2$ will be known when balance is achieved. Preferably, $R_5 = R_6$, such that the value of $R_2 = R_{31}$. During balance of the device in the second mode, care is taken not to disturb the original setting of the tap in order that the value of $R_{31}$ remain unchanged.

Referring to FIG. 9, the connection of the modified form of the invention in its third mode of operation is illustrated. This mode corresponds to the "percentage" mode of operation of the above described form of the invention, the circuitry of which is illustrated in FIG. 5. The values of $R_{31}$ and $R_2$ are left at their original settings and tap 86 associated with potentiometer $R_{p1}$ is adjusted to achieve balance by manual rotation of selector 87. The selector is provided with appropriate indicia, preferably, of 0–100 as the selector of the first described form of the invention. However, it is not essential that the scale of 0–100 be utilized and other scale ranges may be utilized for situations where the fault is a distance greater than 100 feet from the measuring device. Such scale ranges are possible by changing the values of $R_m$. As the bridge is balanced in the third mode, the position of the selector and the reading which it provides is directly proportional to the value of $R_{32}$ and is equal to the distance to the fault. The balance equation for the third mode of operation is as follows:

$$R_{32}/R_{31} + R_2 = R_x/R_L + R_O + R_J$$

Since $R_{31} = R_2$ due to the balance obtained in mode 2, $$R_{32}/2R_{31} = R_x/R_L + R_O + R_J$$
$$R_{32} = R_x (2R_{31})/R_L + R_O + R_J$$

Substituting the value of $R_{31}$ from the balance equation of the first mode of operation, $$R_{32} = 2R_x R_m (R_L + R_O + R_J)/R_1 (R_L + R_O + R_J)$$
$$= 2R_x R_m/R_1$$

Thus, it will be appreciated that the value of $R_{32}$ and the reading obtained is directly proportional to the value of $R_x$ and the distance from the device to the fault. It will also be appreciated that the resistance of $R_L$, $R_O$, and $R_J$ do not affect the reading ultimately obtained and, thus, need not be known. The value of $R_1$ corresponds to the wire size of the faulted conductor and is selectively inserted into the circuit in a manner similar to the first embodiment of the invention. $R_m$ corresponds to the range multiplier resistor as provided with the first embodiment of the invention.

It is apparent that the second form of the present invention is such that it is not necessary to take two readings and compute the product thereof in order to obtain the distance to the fault. By providing three balance modes, the product is in effect computed by the device itself. Since no computations are required, the second form of the invention is extremely valuable in situations requiring quick, on-the-spot measurements or where pencil and paper may not be at hand to compute the product of a pair of readings.

From the foregoing description it will be seen that both forms of the invention provide a versatile means of locating faults without having to know the size of the unfaulted conductor. The overall circuitry is relatively simple in nature and may be mounted in a compact enclosure for easy carrying from one site to another. Minor changes in the circuitry or the manner in which it may be utilized are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for locating a fault in a conductive loop having a faulted conductor comprising a bridge circuit having four branches and a pair of terminals to which the loop is connected, a plurality of resistance devices, switch means connected to said resistance devices for selectively inserting the loop and the resistance devices into the bridge circuit to establish different resistances in each of the branches corresponding to two operational modes, meter means connected to one of the resistance devices and the switch means for indicating balanced conditions in said operational modes of the bridge circuit, and means for adjusting said one of the resistance devices to establish said balance conditions in the two operational modes by resistance values in one of the branches respectively proportional to the total length of said loop and the percentage of said total length of a portion of the loop between the fault and one of the terminals.

2. The combination of claim 1 wherein another of the resistance devices inserted into another one of the branches of the bridge circuit in one of the operational modes has a resistance value proportional to the size of the faulted conductor.

3. The combination of claim 2 wherein the resistance of said one of the reistance devices is divided between two of the branches in a second of the operational modes.

4. The combination of claim 3 wherein said portion of the loop is isolated within yet another one of the branches of the bridge circuit in the other of the operational modes.

5. The combination of claim 4 wherein the bridge circuit includes a source of electrical energy connected to said one of the terminals and to the resistance devices inserted into the bridge circuit in each of the operational modes.

6. The combination of claim 5 wherein said adjusting means includes two separate control devices for respectively varying the resistance of said one of the resistance devices in said two of the operational modes, one of the control devices being operable to vary the resistance of said one of the reistance devices in a third operational mode to obtain a computed reading from said one of the control devices in the second of the operational modes.

7. The combination of claim 1 wherein the resistance of said one of the resistance devices is divided between two of the branches in a second of the operational modes.

8. The combination of claim 7 wherein said portion of the loop is isolated within yet another one of the branches of the bridge circuit in the other of the operational modes.

9. The combination of claim 1 wherein said adjusting means includes two separate control devices for respectively varying the resistance of said one of the resistance devices in said two of the operational modes, one of the control devices being operable to vary the resistance of said one of the resistance devices in a third operational mode to obtain a computed reading from said one of the control devices in the second of the operational modes.

10. A device for locating faults along a pair of electrical conductors extending between first and second locations and which have been shorted at the second location to define a conductive loop, said device comprising a resistance bridge circuit, means for indicating balance of said bridge circuit, first adjustable potentiometer means selectively connectible into said bridge circuit for balancing thereof in first and third modes of operation to respectively determine the total length of said loop and the ratio of a loop portion between a fault and said first of the locations to the entire loop, second adjustable potentiometer means selectively connectible into said bridge circuit in a second mode of operation to obtain a computed reading from the first adjustable potentiometer means in the third mode of operation, resistance means including a plurality of resistance values each corresponding to a conductor resistivity, switch means for selectively connecting the resistance means into said bridge circuit when operated in said first mode, and means for selectively connecting said conductive loop or portion thereof between said fault and said first location into said bridge circuit, said first potentiometer means including first selectively adjustable tap means for inserting a first value of resistance into said bridge circuit to achieve balance thereof in said first mode wherein said first value is directly proportional to the resistance of said conductive loop, said second potentiometer means being selectively adjustable in said second mode to achieve balance of said bridge circuit when a second value of resistance is inserted therein and equal to said first value of resistance, said first potentiometer means further including a second selectively adjustable tap means for inserting a third value of resistance into said bridge circuit to achieve balance in said third mode wherein said third value is directly proportional to the resistance of said portion of faulted conductor, said second tap means being coupled to a selector with associated indicia to provide a reading corresponding to the distance of the fault from said first location.

11. A method for locating a fault in a conductive loop connected to a four branch bridge circuit formed by a plurality of resistance devices, at least one of which is adjustable in resistance value, comprising the steps of: interconnecting two of the resistance devices to form first and second branches of the bridge circuit in a first operational mode; interconnecting the loop and the adjustable resistance device to respectively form third and fourth branches of the bridge circuit in said first operational mode; varying the resistance of said adjustable resistance device in the fourth branch until a balanced condition is obtained in the bridge circuit corresponding to a resistance value in the fourth branch proportional to the length of the loop in the third branch of the bridge circuit in said first operational mode; reestablishing the bridge circuit in a second operational mode by: dividing the adjustable resistance device between the first and fourth of said branches; isolating a portion of the loop between the fault and the adjustable resistance device in the third of the branches; inserting the remainder of the loop into the second of the branches; varying the resistance of the adjustable resistance device in the first and fourth branches until a balanced condition is obtained in the bridge circuit corresponding to a resistance value in the fourth branch proportional to the percentage of said portion of the loop in the third branch to the entire loop in the second and third branches of the bridge circuit in the second operational mode; and computing the product of the adjusted resistance values of the fourth branch of the bridge circuit in the two operational modes.

12. The method of claim 11 wherein said step of computing the product includes: establishing a third operational mode for the bridge circuit in which the resistance of the first branch is adjusted to obtain balance at a resistance value proportional to the adjusted resistance value of the fourth branch in the first operational mode; and inserting the adjusted resistance value of the first branch obtained in the third operational mode into the first branch of the bridge circuit in the second operational mode so that the adjusted resistance value of the fourth branch in the second operational mode becomes directly proportional to the length of said portion of the loop.

13. Apparatus for locating a fault in one of two conductors shorted to form a loop, comprising a bridge circuit having a pair of terminals to which said loop is connected, a plurality of resistance devices adapted to form four branches of said bridge circuit, selector means connected to said resistance devices for selectively inserting the same into the bridge circuit to establish at least two operational modes in which the resistances in each of the branches is different, meter means connected to said bridge circuit for indicating a balanced condition thereof in each of said operational modes to respectively determine the total length of said loop and the ratio of a portion of the loop between the fault and one of the terminals to the entire loop, adjusting means for resistively varying at least one of the resistance devices to obtain said balanced conditions, switch means connected to the other of the terminals and responsive to said selective insertion of the resistance devices in one of the operational modes for isolating said portion of the loop between the fault and said one of the terminals within one of the branches of the bridge circuit, the total resistance of said loop being directly and inversely proportional, respectively, to the resistances of said two of the resistance devices under the balanced conditions, and reading means connected to said one of the resistance devices for indicating the balancing resistance thereof.

14. The combination of claim 13 including means for changing a third of said resistance devices in accordance with wire size of said conductors forming the loop.

15. The combination of claim 13 wherein a third operational mode is established by insertion of a third of the resistance devices into the bridge circuit to obtain a predetermined relationship between the resistance devices inserted into the bridge circuit in each of the operational modes thereby cancelling the total resistance of the loop from the balancing resistance indicated by the reading means, said balancing resistance representing the distance between the fault and said one of said terminals.

16. The combination of claim 13 including second reading means for indicating the balancing resistance of the other of the two resistance devices in the other of the operational modes, the produce of the balancing resistances respectively indicated by said reading means representing the distance between said fault and said one of the terminals.

* * * * *